United States Patent
Naffati

(10) Patent No.: US 11,487,826 B2
(45) Date of Patent: Nov. 1, 2022

(54) METHOD AND APPARATUS FOR DATA COLLECTION FROM A NUMBER OF VEHICLES

(71) Applicant: AUDI AG, Ingolstadt (DE)

(72) Inventor: Malek Naffati, Buxheim (DE)

(73) Assignee: Audi AG, Ingolstadt (DE)

( * ) Notice: Subject to any disclaimer, the term of this patent is extended or adjusted under 35 U.S.C. 154(b) by 77 days.

(21) Appl. No.: 16/319,218

(22) PCT Filed: Jul. 3, 2017

(86) PCT No.: PCT/EP2017/066455
§ 371 (c)(1),
(2) Date: Jan. 18, 2019

(87) PCT Pub. No.: WO2018/015133
PCT Pub. Date: Jan. 25, 2018

(65) Prior Publication Data
US 2019/0266190 A1 Aug. 29, 2019

(30) Foreign Application Priority Data

Jul. 20, 2016 (DE) .......................... 102016008895.8

(51) Int. Cl.
*G06F 16/909* (2019.01)
*G07C 5/00* (2006.01)
(Continued)

(52) U.S. Cl.
CPC .......... *G06F 16/909* (2019.01); *G07C 5/008* (2013.01); *H04L 67/125* (2013.01); *H04L 67/34* (2013.01);
(Continued)

(58) Field of Classification Search
CPC ..... G06F 16/909; G07C 5/008; H04L 67/125; H04L 67/2828; H04L 67/34; H04L 67/2895
(Continued)

(56) References Cited

U.S. PATENT DOCUMENTS 9,021,384 B1 * 4/2015 Beard .................. G06F 3/0481
715/781
9,171,079 B2 * 10/2015 Banka .................. G06F 16/951
(Continued)

FOREIGN PATENT DOCUMENTS

CN           1468409 A      1/2004
DE    102009037234 A1      2/2011
(Continued)

OTHER PUBLICATIONS

International Preliminary Report on Patentability directed to related International Patent Application No. PCT/EP2017/066455, dated Sep. 10, 2018, with attached English-language translation; 20 pages.
(Continued)

*Primary Examiner* — Hosain T Alam
*Assistant Examiner* — Nicholas E Allen
(74) *Attorney, Agent, or Firm* — Sterne, Kessler, Goldstein & Fox P.L.L.C.

(57) ABSTRACT

The present disclosure relates to a method for collecting data from a number of vehicles, in which at least one data collection device of a respective vehicle can be configured to read, store and transmit information recorded by respective vehicle sensors to a server. The at least one data collection device of a respective vehicle can also be configured by means of a control command to generate and transmit to a server a data set using selected values from a number of selected vehicle sensors, and in which the control
(Continued)

command is generated by a central control device and is transmitted to the at least one data collection device.

6 Claims, 1 Drawing Sheet

(51) Int. Cl.
    *H04L 29/08*     (2006.01)
    *H04L 67/00*     (2022.01)
    *H04L 67/125*     (2022.01)
    *H04L 67/5651*     (2022.01)
    *H04L 67/2895*     (2022.01)

(52) U.S. Cl.
    CPC ...... *H04L 67/5651* (2022.05); *H04L 67/2895* (2013.01)

(58) Field of Classification Search
    USPC .......................................................... 707/724
    See application file for complete search history.

(56) References Cited

U.S. PATENT DOCUMENTS

| | | | |
|---|---|---|---|
| 9,460,565 B2 | 10/2016 | Haap et al. | |
| 2004/0167689 A1* | 8/2004 | Bromley | G07C 5/008 701/29.6 |
| 2010/0152960 A1* | 6/2010 | Huber | G06Q 10/06 715/777 |
| 2011/0087662 A1* | 4/2011 | Darby, Jr. | G06Q 50/08 707/736 |
| 2011/0258044 A1* | 10/2011 | Kargupta | G06Q 30/0251 705/14.49 |
| 2011/0320492 A1* | 12/2011 | Inghelbrecht | G06Q 50/30 707/776 |
| 2014/0189888 A1* | 7/2014 | Madhok | H04L 63/08 726/29 |
| 2014/0279868 A1* | 9/2014 | Astorg | G06Q 30/02 707/609 |
| 2015/0081729 A1* | 3/2015 | Rajpathak | G06F 16/284 707/758 |
| 2015/0178737 A1* | 6/2015 | Simpson | G06Q 30/018 705/317 |
| 2015/0269258 A1* | 9/2015 | Hunt, Jr. | G06F 16/955 707/770 |
| 2015/0302084 A1* | 10/2015 | Stewart | G06F 16/358 707/776 |
| 2015/0371153 A1* | 12/2015 | Lohmeier | G06Q 40/025 705/5 |
| 2016/0198306 A1* | 7/2016 | Miles | G06Q 10/0639 455/456.3 |
| 2016/0221592 A1* | 8/2016 | Puttagunta | B61L 25/04 |
| 2018/0300966 A1 | 10/2018 | Zoller et al. | |

FOREIGN PATENT DOCUMENTS

| | | |
|---|---|---|
| DE | 102010022707 A1 | 12/2011 |
| DE | 102011100106 A1 | 10/2012 |
| DE | 102012020637 B3 | 10/2013 |
| DE | 102013223217 A1 | 5/2015 |
| WO | WO 0217184 A1 | 2/2002 |
| WO | WO 2015/100278 A1 | 7/2015 |
| WO | WO-2017/108401 A1 | 6/2017 |

OTHER PUBLICATIONS

International Search Report and Written Opinion of the International Search Authority directed to related International Patent Application No. PCT/EP2017/066455, dated Sep. 7, 2017, with attached English-language translation; 21 pages.

* cited by examiner

US 11,487,826 B2

METHOD AND APPARATUS FOR DATA COLLECTION FROM A NUMBER OF VEHICLES

TECHNICAL FIELD

The present disclosure relates to a method for collecting data from a number of vehicles and a data collection device configured to execute the presented method. Furthermore, the present disclosure relates to a vehicle having a plurality of data collection devices.

BACKGROUND

To collect or gather data from vehicles, gateways are traditionally used, whose functionality is fixedly specified, i.e., whose functionality is fixedly integrated in a hardware structure of a respective gateway. Furthermore, methods are known according to which data is continuously sent from a vehicle to supply structures linked to the vehicle, such as servers, with data from the vehicle.

Accordingly, there is a need for the ability to dynamically generate functions to collect selected data from a vehicle.

German patent application publication DE 10 2009 037 234 A1 discloses a method for transmitting data between a vehicle and a computer as a function of a coupling of a portable device serving as an identification card.

German patent application publication DE 10 2010 022 707 A1 discloses a method for recording and providing information by means of a plurality of image recording devices.

A method for providing surroundings-related information to a server by multiple vehicles is disclosed in German patent application publication DE 102013 223 217 A1.

BRIEF DESCRIPTION OF THE DRAWINGS/FIGURES

DETAILED DESCRIPTION

Figure 1:
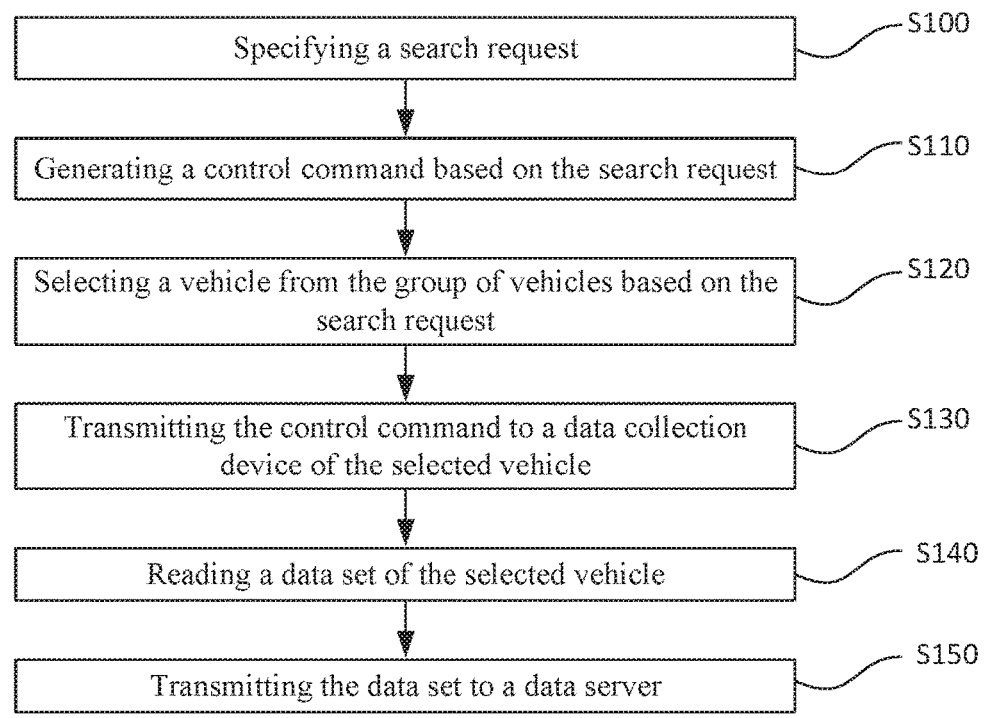
FIG. 1 depicts a schematic view of a possible design of the method, according to some embodiments.

In this context, a method for collecting data from a number of vehicles is presented, in which at least one data collection device of a respective vehicle, the at least one data collection device being configured to read, store and transmit to a server information recorded by respective vehicle sensors, is configured by means of a control command to generate a data set having selected values from a number of selected vehicle sensors and to transmit them to a server, and in which the control command is generated by a central control device and is transmitted to the at least one data collection device.

Designs of the disclosure emerge from the description and the patent claims.

The presented method is used in particular for selectively recording data from a number of vehicles. To do so, it is provided that data recorded by respective vehicles, i.e., data captured by respective sensors of respective vehicles, is read, stored, and transmitted to a server by at least one data collection device arranged in a respective vehicle. To select respective data to be transmitted to a server, it is provided that the at least one data collection device is configured by means of a control command to read, store, and transmit to a server only such data that is relevant to a current search request or a data collection campaign that is assigned to a current search request and is defined by a user for example and is specified for example by the current search request or the data collection campaign. To do so, respective values or sensors to be read out can be automatically selected, for example as a function of key words in a respective search request, or be explicitly defined by the search request or the data collection campaign, which is part of a complex search request.

To configure a respective data collection device in such a manner that only such data or values are read, stored and transmitted, which are relevant for a current search request or a corresponding data collection campaign, it is provided that filters are activated at the data collection device, which filter out non-relevant data or data not specified by the search request, and correspondingly form a data stream, which includes only information that is relevant for the current search request or the data collection campaign. The filters may thereby be provided on the software- and/or hardware-side on the data collection device. The filters are specified in particular by a control command generated specifically for the current search request and are transmitted as a control command to the data collection device.

One possible design of the presented method provides that respective data collection devices from a selected number of vehicles are configured as a function of a search request executed by a central control device, to record respective sensor values specified by the search request and transmit them to the server.

For example, it is conceivable that a search request regarding pollutant emissions of various vehicles is created, which pertains to recording fuel consumption and emission values in a certain geographic region. To do so, a central control device generates a corresponding control command, which is transmitted to respective data collection devices of vehicles in the geographic region and configures the data collection device to operate or generate filters, which require a data stream that includes only recorded values pertaining to fuel consumption and emissions behavior. Correspondingly, the control command includes information on what values from what sensors shall be contained in the data stream. To do so, the control command specifies a number of filters that block or filter out values or sensors not specified by the search request, so that only the values or sensors specified by the search request are recorded or actuated respectively, stored and transmitted by the data collection device to a server for communicating with a user defining the search request.

To automatically transmit, to respective vehicles, control commands allocated to a search request, it is provided that the control commands are centrally organized on a server and are transmitted by a data transmission device. It may thereby be provided that respective control commands for various vehicles are adapted to specifications of a respective vehicle so that, when necessary, sensors present on a respective vehicle are also read if the sensors are specified by a respective search request or are relevant to the search request.

Obviously, it is conceivable that a search request includes multiple subtasks or campaigns, each of which use their own control commands. It is thereby provided that respective campaigns are combined and jointly generated or managed. For example, a search request may include "Europe," "Germany" and "USA" "emissions recording" campaigns, whose control commands are to be executed in a correspondingly geographically restricted manner.

A possible design of the presented method provides that the selection of the number of vehicles is determined as a function of at least one parameter of the following parameter list: duration of the search request, location of a respective vehicles, geographic boundaries of the search request, vehicle-type, vehicle accessories, vehicle identification, vehicle profile data, vehicle driver profile data, or vehicle driver data.

To select respective vehicles, from which data is to be recorded for a certain search request, from a total number of vehicles and to restrict the search request correspondingly to the respective vehicles, it is conceivable that a search request can specify criteria, which a vehicle must satisfy to receive a corresponding control command or to store data transmitted by the vehicle to the server provided according to the disclosure, and to allocate it to the search request. Such criteria may be geographic restrictions for example so that only vehicles in a certain geographic region are evaluated for a respective search request. Obviously, every additional technically suitable criterion can be used to select at least one vehicle from a total number of vehicles. In particular, data about a driver or an owner is suitable for selecting a respective vehicle, so that for example only vehicles used on a work-related basis are used as a data source for a respective search request.

Another possible design of the presented method provides that the control command includes at least one filter function, wherein the at least one filter function is adjusted at the at least one data collection device to specify a quantity of data that is stored in the data set by the at least one data collection device.

Filter functions that are used to select information or data from a data stream provided by a vehicle to a respective data collection device can be specified by a respective search request and be transmitted using corresponding control commands to a respective data collection device or be activated directly by means of a dedicated or independent control command in the data collection device so that the data collection device or a filter provided on the hardware-side turns on or off.

Another possible design of the presented method provides that the server is a cloud server and the central control device is a server connected to the cloud server, wherein the central control device has a user interface, by means of which a user can generate a search request, as a function of which the central control device generates a control command, which is transmitted for configuring the at least one data collection device on at least one vehicle out of the number of vehicles.

By means of a cloud server, it is possible for a respective data collection device, regardless of a distance to a physical memory, to always transmit data to the cloud server when there is a data connection to a mobile communications terminal, for example.

Another possible design of the presented method provides that a secure server is used to transmit a session identifier, which applies to a respective search request, to a respective data collection device.

By means of a session identifier, which is assigned to a respective vehicle or a respective data collection device, secure data transmission can be assured, by the session identifier being used to generate a code, by means of which data to be transmitted by the respective data collection device or a respective vehicle to the server provided according to the disclosure can be coded or decoded.

Furthermore, by means of a session identifier, one can clearly allocate a respective data set to a vehicle or a data collection device.

Another possible design of the presented method provides that respective data to be transmitted by the at least one data collection device to the server is anonymized by means of the session identifier.

By means of a session identifier or a code derived from a session identifier, a respective data set can be individualized without violating privacy rights of a respective vehicle user. This means that on the basis of a respective session identifier, which is provided by a server independent from a respective data collection device, an anonymized or pseudonymized data set can be generated.

Furthermore, the present disclosure relates to a vehicle, wherein the data collection device in a basic setting is configured to record all values detected by respective sensors of a vehicle, and wherein the data collection device includes a number of filters, by means of which in a search setting respective sensors are to be excluded from being recorded according to a control command to be issued.

The presented data collection device is used particularly to execute the presented method.

Furthermore, the present disclosure pertains to a vehicle having a plurality of data collection devices, wherein respective data collection devices of the plurality of data collection devices are assigned to respective control devices of the vehicle and can be configured, as a function of a control command transmitted by a server, to read, store and transmit respective corresponding values for the search request to a server from a respective control device.

The presented vehicle is used in particular to execute the presented method having a plurality of the presented data collection devices.

By using a plurality of data collection devices, a data collection device can be assigned to each control device or to a number of selected control devices of a vehicle. Accordingly, individual data streams can be generated for various control devices, which are each assigned different security levels or are transmitted to different servers to be specifically processed further there.

Additional advantages and designs emerge from the description and the attached drawings.

It is understood that the previously mentioned features and those still to be described below are not only applicable in the respective combination indicated, but also in other combinations or singly without departing from the scope of the present disclosure.

The disclosure is represented schematically by means of embodiments, and is described schematically and extensively with reference to the drawings.

FIG. 1 depicts a schematic view of a possible design of the method according to some embodiments of the disclosure.

Figure 2:
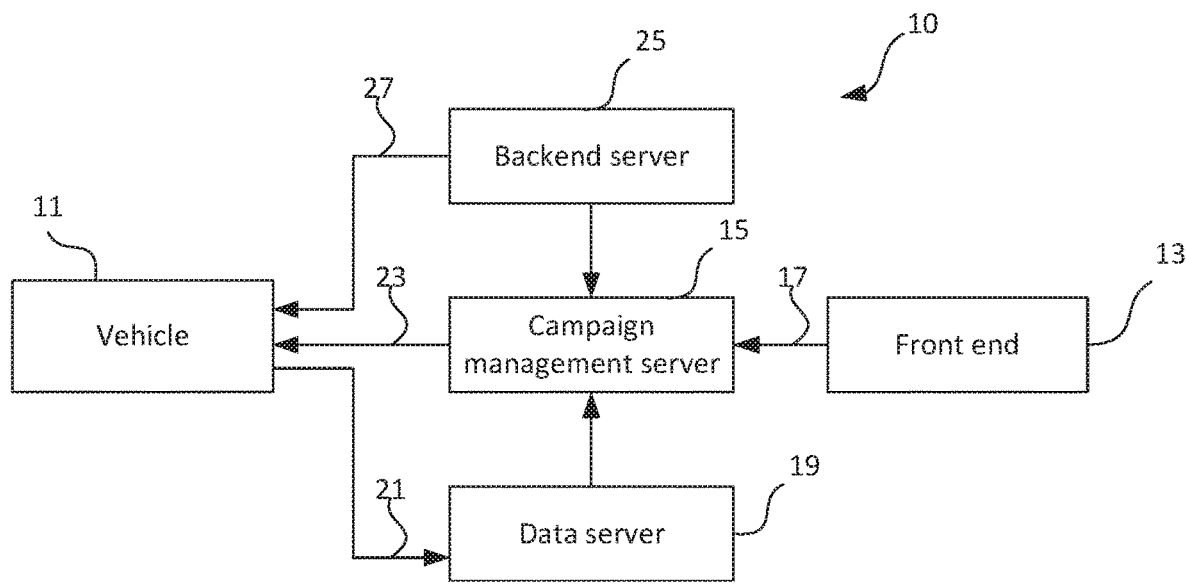
FIG. 2 depicts a schematic view of a communications arrangement for executing a possible design of the method, according to some embodiments.

FIG. 2 depicts a schematic view of a communications arrangement for executing a possible design of the method according to some embodiments of the disclosure.

In FIG. 1, a user specifies in a step S100 a search request. In some embodiments, the search request includes commands to collect fault codes stored in a fault memory of respective engine control units of a number of vehicles. To thematically organize the fault codes and to record them in a time-offset manner from various model series for example, the search request includes a number of campaigns, which include for example commands to collect the fault codes for various model series. To collect corresponding data from respective vehicles, specific control commands are generated at step S110 for a respective campaign by a central control device, e.g., a campaign management server managing the number of campaigns and are transmitted at step S120 by the respective campaign to specified vehicles, for example an "A3"-type model series. Each of data collection devices included by the vehicles of the "A3"-type model series receives the control commands generated by the campaign management server at step S130. Based on the control commands, the data collection devices automatically configure themselves, at step S140, to record, store and transmit respective data specified by the campaign, i.e., respective fault codes. To do so, a respective data collection device activates filters, which filter out data not associated with a fault code from a data stream, which the data collection device receives from a respective control device of a corresponding vehicle. Correspondingly, the data collection device is configured to record, store and transmit to a data server only fault codes.

Using the data transmitted by a respective data collection device to the data server at step S150, search request can be processed and a respective fault behavior can be compared among various series for example.

FIG. 2 depicts an exemplary communications arrangement 10 for managing a search request for collecting data from a number of vehicles 11.

By means of a front end 13, which provides a user interface, a search request is created, which includes a number of campaigns. The search request is transmitted to a campaign management server 15, as indicated by arrow 17. Campaign management server 15 identifies the respective control commands required for the search request to configure respective data collection devices of the number of vehicles 11 in such a manner that they read, store and transmit, as indicated by arrow 21, the respective vehicle data, corresponding to the search request, to a data server 19, which is designed as a cloud server. To do so, campaign management server 15 transmits the identified control commands for example via a mobile communications network or any other technically suitable interface to respective data collection devices of the number of vehicles 11, as indicated by arrow 23.

To safeguard privacy rights and to assign respective search request data transmitted to a data server 19, a backend server 25 transmits a vehicle-specific session identifier to the corresponding vehicles 11, as indicated by arrow 27, for every transmission of a control command by a campaign management server 15. By means of the vehicle-specific session identifier, respective data transmitted by a vehicle can be transmitted to data server 19 in an anonymized or pseudonymized manner.

The invention claimed is:

1. A method for dynamically collecting a data set from a group of vehicles, comprising:
generating, by a central control device, a control command based on a search request from a user;
selecting, based on a criterion, a vehicle from the group of vehicles, wherein the criterion is specified in the search request;
transmitting, by the central control device, the control command to a data collection device of the selected vehicle;
selecting one or more sensors of the selected vehicle based on a filter, wherein
the filter is implemented in software or hardware on the data collection device; and
the filter is specified and activated by the control command received at the data collection device;
detecting, by the selected one or more sensors of the selected vehicle, performance data selected by the filter;
reading, by the data collection device, the data set comprising only the performance data selected by the filter;
transmitting, by a secure server, a session identifier to the data collection device, wherein the session identifier is assigned uniquely to the search request; and
transmitting, by the data collection device, the data set to a data server, wherein the data set is anonymized by the session identifier.

2. The method of claim 1, wherein selecting the vehicle includes
selecting based on a geographic limit from the search request, or data on a driver of the selected
vehicle, or an owner of the selected vehicle.

3. The method of claim 1, wherein the data server is a cloud server and
the central control device is another server connected to the cloud server.

4. The method of claim 1, further comprising:
receiving, by the central control device, the search request at a user interface of the central control device.

5. The method of claim 1, wherein selecting the vehicle further includes selecting based on a vehicle model, a vehicle accessory, a vehicle identification or vehicle profile data.

6. The method of claim 1, wherein the selected performance data comprise fuel consumption, emission behavior or fault code of the selected vehicle.

* * * * *